(12) United States Patent
Duwenhorst

(10) Patent No.: US 8,890,869 B2
(45) Date of Patent: Nov. 18, 2014

(54) COLORIZATION OF AUDIO SEGMENTS

(75) Inventor: Sven Duwenhorst, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 1041 days.

(21) Appl. No.: 12/228,488

(22) Filed: Aug. 12, 2008

(65) Prior Publication Data
US 2014/0035920 A1 Feb. 6, 2014

(51) Int. Cl.
*G06T 11/20* (2006.01)
*G10L 13/00* (2006.01)

(52) U.S. Cl.
USPC .................. 345/440; 345/440.1; 704/257

(58) Field of Classification Search
USPC ................ 345/440, 440.1; 704/257; 84/609
See application file for complete search history.

(56) References Cited

U.S. PATENT DOCUMENTS

| | | | |
|---|---|---|---|
| 5,434,593 A * | 7/1995 | Lecklider et al. | 345/634 |
| 5,649,060 A | 7/1997 | Ellozy et al. | |
| 6,466,211 B1 * | 10/2002 | Havre et al. | 345/440 |
| 7,062,442 B2 * | 6/2006 | Berg et al. | 704/270 |
| 7,184,959 B2 * | 2/2007 | Gibbon et al. | 704/270 |
| 7,232,948 B2 * | 6/2007 | Zhang | 84/600 |
| 7,366,671 B2 | 4/2008 | Xu et al. | |
| 7,500,190 B1 * | 3/2009 | Bhatt | 715/704 |
| 7,521,622 B1 * | 4/2009 | Zhang | 84/609 |
| 7,522,967 B2 * | 4/2009 | Zhang et al. | 700/94 |
| 7,545,377 B2 * | 6/2009 | Dobyns et al. | 345/440.1 |
| 7,624,012 B2 * | 11/2009 | Pachet et al. | 704/249 |
| 7,668,718 B2 * | 2/2010 | Kahn et al. | 704/270 |
| 7,709,723 B2 * | 5/2010 | Pachet et al. | 84/603 |
| 7,772,480 B2 * | 8/2010 | Brennan | 84/615 |
| 7,928,310 B2 * | 4/2011 | Georges et al. | 84/645 |
| 8,229,754 B1 * | 7/2012 | Ramirez et al. | 704/278 |
| 2003/0068053 A1 * | 4/2003 | Chu | 381/118 |
| 2004/0078188 A1 * | 4/2004 | Gibbon et al. | 704/1 |
| 2004/0199395 A1 * | 10/2004 | Schulz | 704/278 |
| 2005/0122325 A1 * | 6/2005 | Twait | 345/440 |
| 2007/0067174 A1 | 3/2007 | Verma et al. | |
| 2008/0141850 A1 * | 6/2008 | Cope | 84/609 |
| 2008/0235021 A1 * | 9/2008 | Cross et al. | 704/257 |
| 2009/0024911 A1 * | 1/2009 | Margolis | 715/215 |

OTHER PUBLICATIONS

Degen et al., Working with Audio: Integrating Personal Tape Recorders and Desktop Computers, Proceeding of the SIGCHI conference on Human factors in computing systems, May 3-7, 1992, ACM pp. 413-418.*

(Continued)

*Primary Examiner* — M Good Johnson
(74) *Attorney, Agent, or Firm* — Shook, Hardy & Bacon L.L.P.

(57) ABSTRACT

This specification describes technologies relating to visual representations indicating segments of audio data. In general, one aspect of the subject matter described in this specification can be embodied in methods that include the actions of receiving digital audio data including hierarchical segment information, the hierarchical segment information identifying one or more segments of the audio data for each of multiple of segment types and displaying a visual representation of the audio data at a first zoom level in an interface, the visual representation displaying audio data as a function of time on a time axis and a feature on a feature axis, the visual representation further including a display of identifiers for each segment of one or more segments of a first segment type. Other embodiments of this aspect include corresponding systems, apparatus, and computer program products.

58 Claims, 5 Drawing Sheets
(3 of 5 Drawing Sheet(s) Filed in Color)

(56) References Cited

OTHER PUBLICATIONS

Wang et al., Multimedia Content Analysis Using Both Audio and Visual Clues, IEEE Signal Processing Magazine, Nov. 2000, pp. 12-36.*

Kimber et al., Speaker Segmentation for Browsing Recorded Audio, ACM, May 7-11, 1995, pp. 212-213.*

Tzanetakis, George, and Perry Cook, Audio information retrieval (AIR) tools, International Symposium on Music Information Retrieval, 2000 (date unknown).*

Huang et al., Automated generation of news content hierarchy by integrating audio, video and text information, 1999 IEEE International Conference on Acoustics, Speech and Signal Processing, vol. 6, pp. 3025-3028.*

Rice et al., A System for Searching Sound Palettes, Eleventh Biennial Symposium on Arts and Technology, New London, Connecticut, Feb. 28-29, 2008, pp. 174-179.

* cited by examiner

COLORIZATION OF AUDIO SEGMENTS

BACKGROUND

The present disclosure relates to visual representations of audio data.

Different visual representations of audio data are commonly used to display different features of the audio data. For example, an amplitude waveform display shows a representation of audio intensity in the time-domain (e.g., a graphical display with time on the x-axis and intensity on the y-axis). Similarly, a frequency spectrogram shows a representation of frequencies of the audio data in the time-domain (e.g., a graphical display with time on the x-axis and frequency on the y-axis).

Speech transcription is a process that provides identifies a script (e.g., English text) from corresponding audio speech. Typically, speech transcription includes performing speech recognition on the audio data. Speech recognition uses one or more techniques to identify audio as corresponding to particular text. Conventional speech recognition application often use techniques based on hidden Markov models, which are statistical models trained to identify text segments (e.g., words or phonemes) likely to correspond to particular audio data.

Additionally, the speech transcription can include a mapping from audio to the corresponding identified text. The mapping can identify, for example, particular points in time corresponding to a beginning or ending of a word (e.g., the mapping can identify, for a particular transcribed word, a beginning time and an ending time in the audio data corresponding to that word).

SUMMARY

This specification describes technologies relating to visual representations indicating segments of audio data.

In general, one aspect of the subject matter described in this specification can be embodied in methods that include the actions of receiving digital audio data including hierarchical segment information, the hierarchical segment information identifying one or more segments of the audio data for each of multiple of segment types and displaying a visual representation of the audio data at a first zoom level in an interface, the visual representation displaying audio data as a function of time on a time axis and a feature on a feature axis, the visual representation further including a display of identifiers for each segment of one or more segments of a first segment type. Other embodiments of this aspect include corresponding systems, apparatus, and computer program products.

These and other embodiments can optionally include one or more of the following features. The method further includes receiving an input to change the first zoom level of the visual representation of the audio data to a second zoom level and modifying the visual representation according to the second zoom level including determining a segment type for the second zoom level and displaying identifiers in the visual representation of one or more segment at the determined segment type. The method further includes receiving an input to change the first segment type displayed in the visual representation of the audio data to a second segment type that is distinct from the first segment type and modifying the visual representation of audio data to display one or more segments at the second segment type.

Receiving the input to change the first segment type includes receiving a user input to a slider presented in the interface. The visual representation is an amplitude waveform and the identifiers of the one or more segments in the visual representation are displayed in one or more colors in the amplitude waveform. The method further includes identifying one or more third segments at a segment type distinct from the first segment type according to a background identifier relative to the amplitude waveform in the visual representation of the audio data. The background identifier is a different color for each identified third segment.

The method further includes identifying distinct speakers associated with the segments displayed in the visual representation according to a corresponding background identifier. Each speaker is identified with a different background color.

The method further includes receiving a selection of a particular segment of the first segment type and performing an editing operation on the portion of the audio data corresponding to the selected segment. The method further includes receiving an input to change the first segment type associated with the selected portion of the audio data to a next larger segment type or to next smaller segment type according to a hierarchy of segment types. The editing includes expanding or contracting a selected segment in time with respect to a reference audio segment. the editing includes modifying the audio data of the selected segment.

The method further includes displaying in the visual representation of audio data an indicator of confidence level for each of the one or more identified segments where the confidence level indicates a confidence in the transcription of the segment to the audio data. The hierarchical segment information is speech transcription information and the segment types include one or more of phoneme, word, sentence, paragraph and speaker. The hierarchical segment information is musical structural information. The identifiers for each segment identify boundaries between segments including inverting a position of adjacent identifiers within the visual representation of the audio data. The method further includes receiving a selection of a particular segment of the first segment type and responsive to a received input, modifying the visual representation of audio data to display a second segment type associated with the selected segment.

In general, one aspect of the subject matter described in this specification can be embodied in methods that include the actions of receiving digital audio data including hierarchical segment information, the hierarchical segment information identifying one or more segments of the audio data for each of multiple segment types and displaying a visual representation of the audio data at a first zoom level in an interface, the visual representation displaying audio data as a function of time and segment type, the visual representation further including a display of identifiers of one or more segments of one or more segment types. Other embodiments of this aspect include corresponding systems, apparatus, and computer program products.

Particular embodiments of the subject matter described in this specification can be implemented to realize one or more of the following advantages. Navigation of transcribed audio data is simplified using a visual representation of the audio data. Identifying different speech segments (e.g., phonemes, words, sentences, paragraphs) is simplified using particular intuitive indicators (e.g., color coding) for the different segment types. For example, a user editing a word "stop" can easily identify the beginning of the word, corresponding to the "s" sound, based on an indicator of the particular phonemes, which can identify sub-word acoustic units including the "s" sound of "stop".

The identification of different segment types can be performed without changing the scale of the visual representation (e.g., by zooming in and out of the visual representation).

Alternatively, the displayed segment types can dynamically change according to a particular zoom of the visual representation. Indicators allow users to quickly identify boundaries between adjacent segments. Users can also quickly identify the source speaker of the individual speech segments. Additionally, segments can be used to easily locate and edit the audio data.

Identifying particular segments of audio data can allow users to perform editing operations on the audio data precisely including aligning or stretching segments with respect to time, snapping segments to particular times (e.g., frame alignment) or segments, and replacing a segment with another while maintaining duration of the original segment (e.g., including applying an automatic time stretch to the replacement segment).

Visualization of the segments can increase the usability of the visual representation. For example, search results for segments in the audio data can be shown in a particular color or other indicator. Additionally, an intensity or brightness of the indicator (e.g., brightness of a color) can visualize the confidence level of the segment transcription or display other statistical information. A tool can be used to blend in/out areas of the visual representation (e.g., an amplitude waveform), where the confidence level is below or above a specified threshold.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numbers and designations in the various drawings indicate like elements.

DETAILED DESCRIPTION

Figure 1:
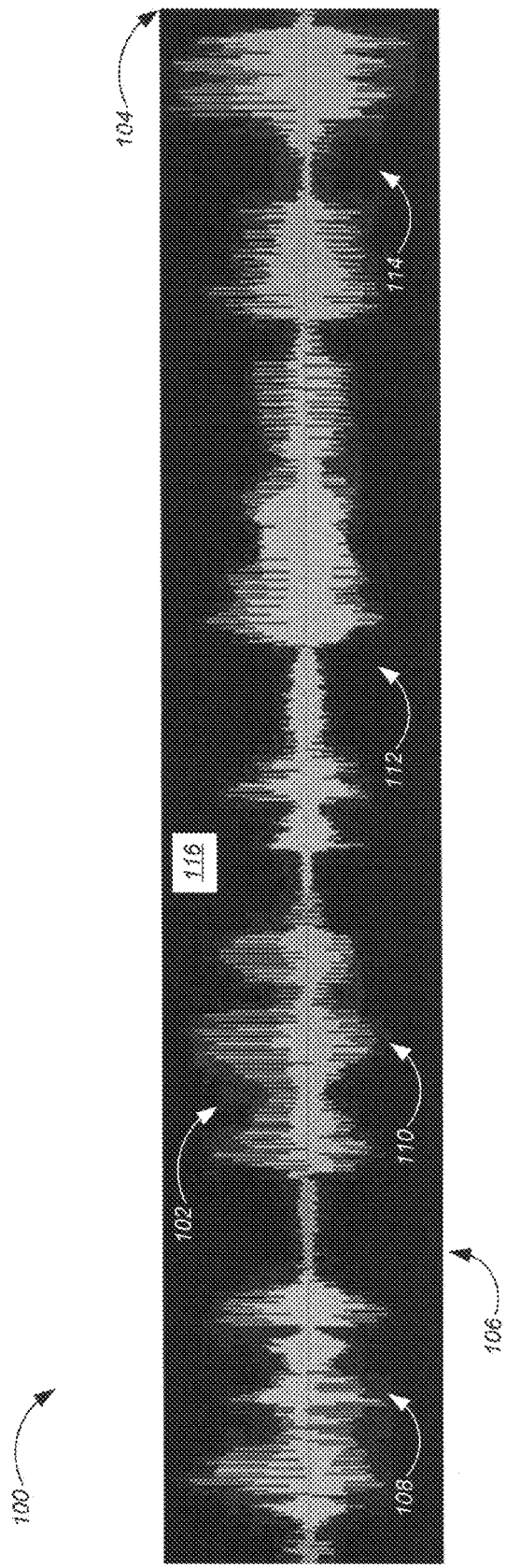
FIG. 1 is an example display of a visual representation of audio data.

FIG. 1 is an example display of a visual representation 100 of audio data. The visual representation 100 includes an amplitude waveform 102 displaying amplitude of audio data with respect to time. In particular, the amplitude of the audio data is displayed on a y-axis 104 while time is displayed on an x-axis 106. A portion of the audio data show in the visual representation 100 can depend on a scale or zoom level of the visual representation within a particular interface.

The zoom level indicates a level of detail of the audio data visible for a given interface. For example, for a given interface size (e.g., for given pixel dimensions), a higher zoom level will show more detail of the audio data than a lower zoom level. However, a higher zoom level will also show less of the audio data with respect to one or more axis. For example, the higher zoom level can display a smaller time window of the audio data than a lower zoom level (e.g., a first zoom level can display an amplitude waveform over a time of one minute while a higher zoom level can display a portion of the amplitude waveform over ten seconds).

As shown in FIG. 1, the amplitude waveform 102 includes identified segments 108, 110, 112, and 114 of a particular segment type. For example, the segments 108, 110, 112, and 114 can represent a first, second, third, and fourth word, respectively. Each segment includes an indicator (e.g., a color or shading) to distinguish the segment from an adjacent segment. Thus, boundaries between segments can be readily identified. For example, the amplitude waveform 102 includes the third segment 112 colored red while the fourth segment 114 is colored blue. As a result, the boundary between the third segment 112 and the fourth segment 114 is clearly demarcated.

Additionally, portions of the amplitude waveform 102 that are not identified as belonging to a particular segment are displayed in another color (e.g., green). Portions of the amplitude waveform 102 can be identified as not belonging to a particular segment, for example, because the corresponding audio data indicates a pause in speech, noise, background music, or other audio data not related to the particular segment types. In some other implementations, audio data for non-segments is not colored or otherwise identified.

The visual representation 100 also includes a background 116 relative to the amplitude waveform. In particular, the background 116 of FIG. 1 is black. However, other colors can be used for the background 116. Additionally, the background 116 can provide additional information associated with the audio data e.g., to provide nested segment information within the visual representation 100. For example, while the visual representation 116 does not indicate particular segment information, various combinations of background and amplitude waveform coloring can be used to visualize different segment types including phonemes, words, sentences, paragraphs, and speakers. In some implementations, only a portion of the visual representation is colored (e.g., only a top half of an amplitude waveform, or portion of a frequency spectrogram). The boundary between segments, e.g., between words or phonemes, can then be shown, for example, by inverting the portion of the waveform colored (e.g., inverting top half and bottom half for adjacent segments). Some examples of displaying different segment types in a single visual representation is described in greater detail below with respect to FIGS. 3-6.

Figure 2:
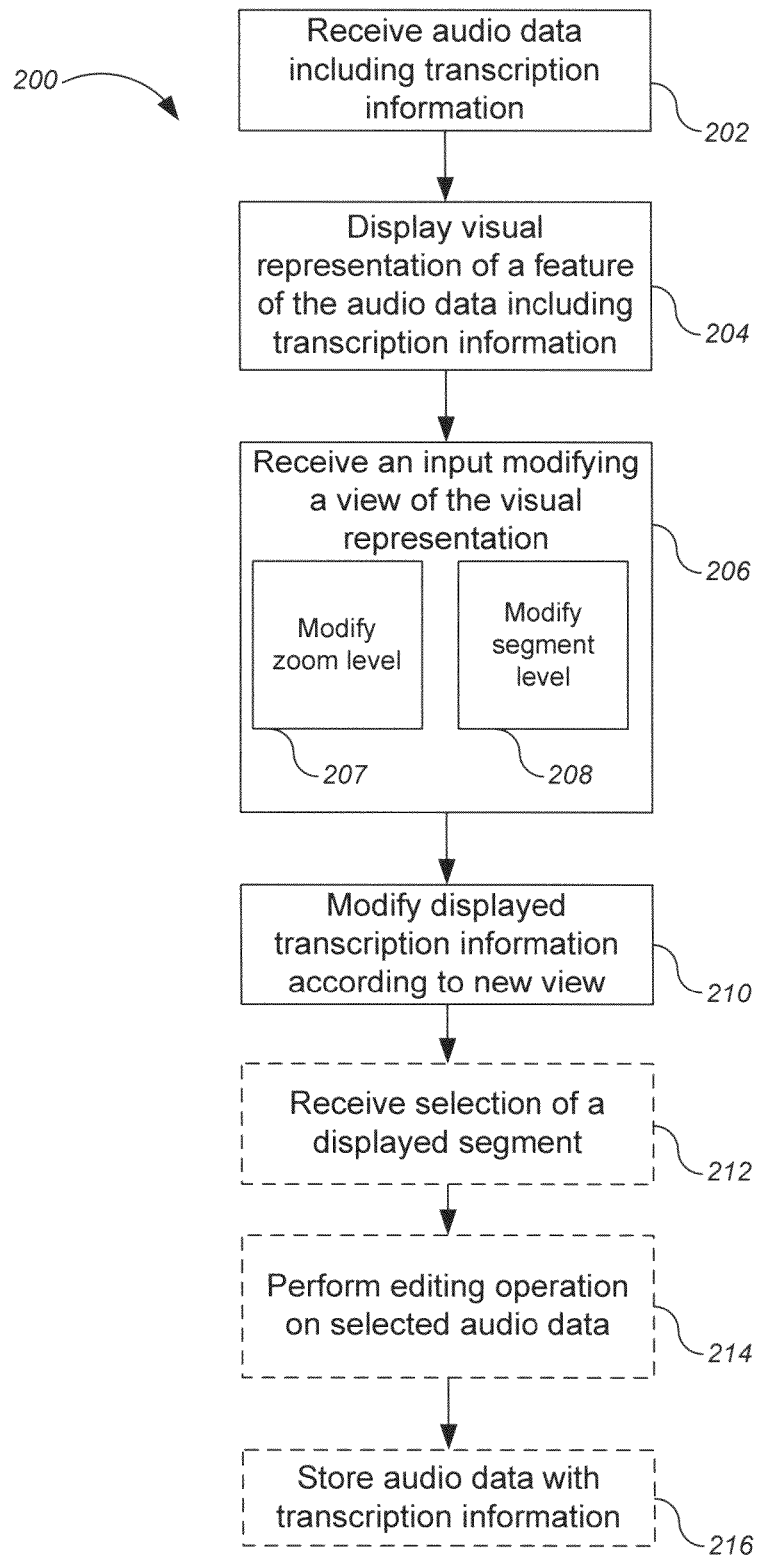
FIG. 2 is a flow chart of an example method for displaying audio data including segment indicators.

FIG. 2 is a flow chart of an example method 200 for displaying audio data including segment indicators. For convenience, the method 200 will be described with respect to a system performing the method 200.

The system receives 202 audio data including transcription information. The system can receive the audio data, for example, as part of an file (e.g., an audio file or other file including embedded audio including, for example, a WAV, digital video (DV), or other audio or video file). The file can be locally stored or retrieved from a remote location, including as an audio of video stream. The audio data can be received, for example, in response to a user selection of a particular file (e.g., an audio file having one or more tracks of audio data). A track is a distinct section of audio data, usually having a finite length and including at least one distinct channel. For example, a track can be digital stereo audio data contained in an audio file, the audio data having a specific length (e.g., running time), that is included in a mix (e.g., a combination of tracks) by assigning a specific start time and other mixing parameters.

In some implementations, the audio data is retrieved from a file stored at a remote location without transferring the file. For example, the system can retrieve the portion of the audio data in the remotely stored file used to present a visual representation of the audio data.

The audio data can include any audio data having a hierarchical structure of segments which can be located in time and duration. In some implementations, the hierarchical structure is described by metadata. Speech transcription information, for example, can be provided by metadata associated with the received audio data. For example, an audio file can include audio data and metadata including transcription information associated with the audio data. Alternatively, the audio file can be received with a sidecar file including the metadata associated with the received audio data.

In some implementations, the metadata is provided in an XML description. Segments of different types (e.g., speech, speakers) can be represented in a hierarchy of segments (e.g., paragraph segments, sentence segments, word segments, phoneme segments for speech or other segments illustrating audio structure, for example, of a song), can be represented in a nested XML structure. In another implementation, the metadata can be looked up at a remote location using identification of the audio data by an embedded globally unique identifier "GUID" or scanning the retrieved audio data to identify the audio data (e.g., using a watermark) and use this information to retrieve XML description. Each segment can include additional information (e.g., information identifying a location and duration of the each segment within the audio data, positioning data, for example GPS coordinates, associated with the audio data, an author of the audio data, or other information associated with the audio data).

In some implementations, the audio data is received by the system with the associated metadata. In other implementations, the system generates the metadata from received audio data without associated metadata. For example, a digital audio workstation can include a transcription engine that receives an input audio data and produces transcription information associated with that input audio data.

The metadata can include structural information about segments of different types. For example, for speech transcription, the metadata can include transcription information identifying speech segments of the audio data, their location within the audio data, and a duration of the segment. The segments types can include text of different lengths identifying phonemes, words, phrases, sentences, paragraphs, and other text segments. Segment types can also include portions of the audio data identifying a particular speaker. Additionally, the information can include associations with other segment types. For example a segment type corresponding to a particular word can be associated with a segment type identifying a sentence to which the word belongs.

A nesting of segments to show hierarchical structure is shown, for example, for speech data associated with the audio, as follows:

Speaker 1
    Paragraph 1
        Sentence 1
            Word 1
                Phoneme 1
                Phoneme 2

Word 2
...
Speaker 2
...

Alternatively, in another implementation, the metadata can provide information for non-speech information. For example, the audio data can be musical data having particular structural elements. Thus, song metadata can be associated with audio data for a song. Segment types at hierarchical levels can be used to display different portions of the structure. For example, one level can include parts of a song as segment types (e.g., bridge, intro, outro, refrain). A more detailed level can include other segment types including, e.g., bars and beats.

The system displays 204 a visual representation of the audio data. For example, a particular feature of the audio data can be plotted and displayed in a window of a graphical user interface (e.g., of a digital audio workstation). The visual representation can be selected to show a number of different features of the audio data. In some implementations, the visual representation displays a feature of the audio data on a feature axis and time on a time axis. For example, visual representations can include a frequency spectrogram, an amplitude waveform, or a balance or panorama position display.

In some implementations, the visual representation includes an amplitude waveform. The amplitude waveform shows audio intensity (i.e., amplitude) in the time-domain (e.g., a graphical display with time on the x-axis and intensity on the y-axis). In some alternative implementations, the visual representation is a frequency spectrogram. The frequency spectrogram shows audio frequency in the time-domain (e.g., a graphical display with time on the x-axis and frequency on the y-axis). Additionally, the frequency spectrogram can show intensity of the audio data for particular frequencies and times using, for example, color or brightness variations in the displayed audio data. In some alternative implementations, the color or brightness can be used to indicate another feature of the audio data e.g., pan position.

In other implementations, the visual representation includes a pan position or phase display. The pan position display shows audio balance (stereo) or panorama (mono) position (e.g., left and right spatial position) in the time domain (e.g., a graphical display with time on the x-axis and balance/pan position on the y-axis). The phase display shows the phase of audio data at a given time.

Additionally, the visual representation includes indicators identifying one or more segments of one or more segment types. For example, for a visual representation including an amplitude waveform, portions of the amplitude waveform can be colored to indicate particular segments. Additionally, a background of the visual representation relative to the amplitude waveform can also include an one or more identifiers (e.g., colors) to indicate segments of one or more segment types. For example, the amplitude waveform can be colored to indicate segments of one segment type (e.g., word or, phonemes) while the background can be colored to indicate segments of another segment type (e.g., individual sentences, the speaker associated with a portion of the amplitude waveform). For example, the audio data can represent a conversation between two speakers. The background indicator (e.g., a particular background color) can identify the portions of the amplitude waveform where each speaker is speaking while other indicators in the amplitude waveform itself can indicate another segment type.

Different combinations of indicators can be used for a visual representation at a given zoom level. For example, a color of an amplitude waveform can indicate words, a color of the background below the amplitude waveform can indicate sentences, and a color of the background above the amplitude waveform can indicate particular speakers. Alternatively, either the background or the representation of the audio data can be without segment identifiers (e.g., the background can identify segments of a particular type while the amplitude waveform does not include segment indicators).

While the above examples have been described in terms of color indicators for segments, other indicators can be used in combination with or instead of color. For example, grayscale, patterns, time axis markers, and other indicators can be used.

In some implementations, the particular segments indicated depend upon the zoom level of the visual representation. For example, at a first zoom level an amplitude waveform can include indicators (e.g., particular colors of the amplitude waveform) identifying sentences in the audio data. When the visual representation is modified to display the amplitude waveform at a second, increased, zoom level the segment indicators can also be modified to show segments of a different segment type (e.g., according to a hierarchy or nesting of segment types). For example, the amplitude waveform at the second zoom level can include indicators (e.g., particular colors of the amplitude waveform) identifying words in the audio data instead of sentences. Similarly, increasing the zoom level further can result in a visual representation of the audio data where the indicators identify phoneme segments in the audio data instead of individual words.

In some implementations, a user can interact with the segment indicators to obtain additional information. For example, a user can hover over a particular segment shown in the visual representation (e.g., hover over a portion of an amplitude waveform colored to indicate a particular segment). When hovering, the system can present additional information to the user, for example, as a pop-up box or text in a specified field of the interface including the visual representation. The additional information can identify the type of segment (e.g., sentence, word, phoneme) as well as the corresponding transcribed content (e.g., the particular word represented by the segment of audio data).

Additionally, the additional information can include information not shown in the visual representation. For example, if a sentence extends beyond the visible portion of the audio data shown in the visual representation, the additional information can include the text of the full sentence or just the text of the portion of the sentence visible within the currently displayed visual representation.

The system receives 206 an input modifying a view of the visual representation. In some implementations, the input modifying the view is an input modifying 207 a zoom level of the visual representation. The system can present the visual representation in an interface that allows a user to zoom-in or out to provide visual representations of audio data showing different levels of magnification. For example, the user can zoom into a portion of the amplitude waveform both in terms of intensity and time. Zooming allows the user to view a visual representation of the portion of the audio data in greater detail.

Alternatively, in some implementations the received input modifying the view is an input modifying 208 one or more of the displayed segment types. The system can provide a slider tool within the interface allowing a user to change one or more of the displayed segment types. For example, the slider can be used to modify the segment type displayed in the amplitude waveform. One position on the slider can provide a display of segments corresponding to words in the amplitude waveform while another position on the slider can provide a display of segments corresponding to sentences in the amplitude waveform (e.g., based on a change in the coloring of the amplitude waveform in the displayed visual representation). Alternatively, one or more modifier keys can be used to increment or decrement the segment type displayed.

Similarly, the slider settings can be adjusted, or another slider can be provided, allowing a user to modify the segment type displayed in the one or more background portions of the visual representation relative to the amplitude waveform. Alternatively, the input can be received using one or more drop down menus or toolbars provided in the interface.

The system modifies 210 the visual representation. For example, if the input modifying the view is an input to change a zoom level, the system modifies the visual representation to display a portion of the audio data at the new zoom level. Thus, if the input increases the zoom level, a smaller portion of the audio data is shown (e.g., a smaller time period) in the visual representation.

The system can further modify the visual representation to display segments of a particular type based on the change in zoom level. In some implementations, the system automatically modifies the segment type based on the resulting zoom level. For example, if the segment type before the input was a word level, increasing the zoom by a specified amount causes the system to change the segment type displayed from the word level to a phoneme level. The segment type to use for a particular zoom level can be determined according to a relation between segment types and zoom amounts. The segment types can be related in a hierarchy such that increasing the zoom by a threshold amount causes the segment type to move a step in the hierarchy. In some other implementations, the segments type remains the same during zooming. For example, if the segment type before the input was a word level, the segment type after changing the zoom level remains the word level.

In some implementations, the system uses segment duration to determine whether to switch segment level according to a change in zoom level such that some specified amount of segment information is presented. For example, if a particular sentence has a duration of 15 seconds, where each word has a duration of substantially 2 seconds, the system can switch to the sentence segment level if a zoom level reveals ¾ of the sentence as visible. Alternatively, the system can switch the segment level when the zoom level displays ⁴⁄₃ of the sentence duration (e.g., 20 sec), so that the sentence and the surrounding segments are visible. The above criteria are only provided as examples. A number of rules can be specified which determine when the segment level is modified based on changes in zoom level.

Alternatively, if the input modifying the view is an input to change one or more of the segment types displayed in the visual representation, the system modifies the indicators accordingly while retaining the displayed portion of the audio data at the same zoom level. For example, if the input changes the segment type from words to sentences the system modifies the indicators in the visual representation to indicate sentences in the audio data instead of words. Thus, if the individual words were indicated by particular coloring of an amplitude waveform, the system modifies the coloring of the amplitude waveform to indicate sentences instead of words.

The system optionally receives 212 an input selecting a particular segment of the audio data presented in the visual representation of the audio data. For example, a user can select a particular segment using an input device (e.g., keyboard, mouse, or other input device). In some implementations, a user selects a particular segment by double clicking on the segment within the visual representation. For example, a single click can snap a time index to the beginning of the segment (e.g., for playback beginning with the segment) while a double click can select the entire segment.

Upon selection, information about the segment can be presented to the user including the type of segment, the length of the segment, and the transcribed content of the segment (e.g., if the segment is a word, the transcribed word). The information can be presented as a pop-up layer or window in the interface, or in a separate portion of the interface (e.g., a separate frame within an interface including the visual representation). Additionally, time index markers can appear within the visual representation identifying the beginning and ending points of the segment. Other information that the system can present includes statistical information about the audio data as a whole or the selected segment (e.g., a selected word). For example, the number of times the word occurs in the audio data or a confidence level of the transcription for the word.

Once selected, an additional input can be used to toggle between a display of segment types of which the segment is a part. For example, if the visual representation includes a display of a segment type showing words within an amplitude waveform, a selected segment corresponds to a single word. The user can then toggle this selection to other segment types containing or a part of the selected segment, for example, using a particular keystroke. For example, if the user has selected a particular word, toggling can display a sentence segment including the selected word within the visual representation. Toggling again can display a next segment type (e.g., paragraph segment associated with the selected word). Similarly, the user can toggle to a more detailed segment type such that the phonemes that constitute that selected word are displayed.

Additionally, the selected segment can be played. For example, the user can play the particular selected segment such that playback ends when the end of the segment is reached. Alternatively, the user can play the segment at the toggled level, as described above. Thus, the user can play an entire sentence associated with the selected word when the user toggles the segment type from a selected word to a sentence segment type including that word.

In an alternative implementation, the user plays the audio data excluding the speech content of the selected segment. For example, a particular segment identifying a word may also include other audio data e.g., background noise or music. The user can play the selected segment including the speech content (e.g., the selected word) such that only the non-speech audio is played (e.g., only the background music is played). For example, if the system knows the frequencies associated with the segment, the system can filter the audio data by removing or reducing the level of frequencies or extrapolating the area with outside material.

The system optionally performs 214 one or more editing operations on the audio data. The user can identify a particular editing operation to perform on the segment, for example, using one or more drop-down menus or toolbar buttons provided in the interface. For example, the user can cut the selected segment from the audio data. The cut segment can be replaced with other audio data, for example, an alternative segment or other audio data (e.g., music). In some implementations, when the cut segment is replaced, the system adjusts the length of the replacements segment (automatically or manually) to match the length of the cut segment.

Other editing operations can be performed that modify the audio data of the segment. For example, editing operations that can be performed include amplification, compression, and pitch shifting. Additionally, for audio data including multiple recordings of the same content (e.g., multiple takes of the audio), the structure of one take can be compared with other takes (e.g., comparing multiple tracks of audio data corresponding to similar audio content).

In some other implementations, editing is performed in order to align speech content. For example, the audio data can be associated with translated audio data (e.g., the audio data is derived from speech in another language). However, the length of particular segments may be different in one language than in another.

In some scenarios, the length of particular segments in the translation should match the length in the original language. For example, the audio data can be used to dub the speech from a video having audio in another language. The dubbed audio should match the speakers on video as closely as possible. However, some sentences in one language translated into sentences in another language have different lengths. Consequently, the user can adjust the length (e.g., expand or compress with respect to time) of a selected segment to correspond to the length of some reference audio or video. Alternatively, the system can automatically perform the length adjustment.

In some implementations, two tracks are presented in the interface, the first having a visual representation of the audio data in one language and the second having a visual representation of the audio data in another language. The user can select segments and adjust the audio data in one track to match the length of corresponding segments in the other track.

The system optionally stores 216 the audio data including the transcription information. The system can store modified audio data according to any editing of the audio data. Additionally, the system can store particular state information associated with the audio data (e.g., a particular zoom level or a particular segment level displayed), which can be used to determine the state of the visual representation displayed a next time the audio data is retrieved. The audio data can be stored for later playback, transmission, or other processing.

Figure 3:
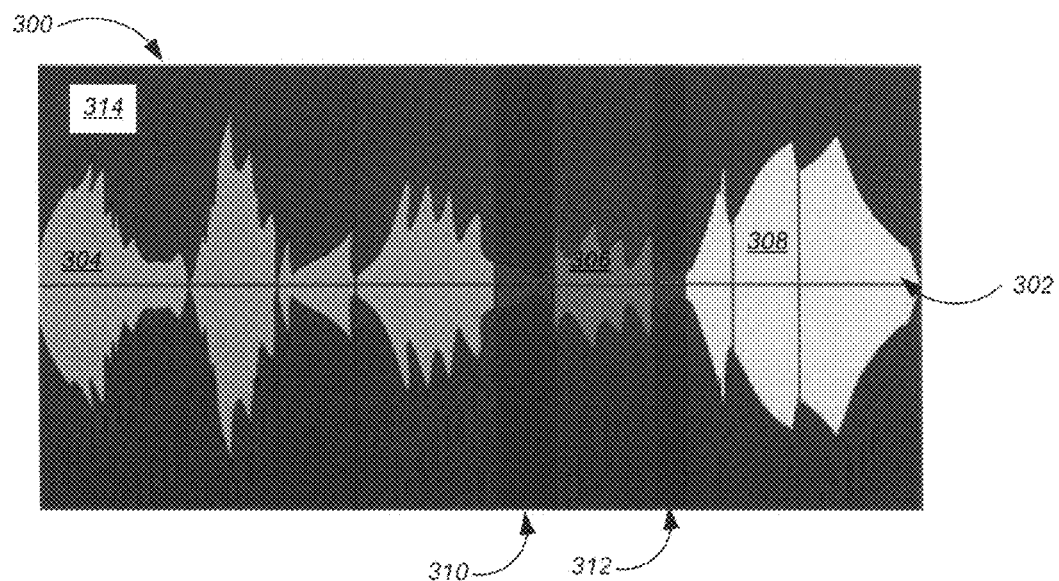
FIG. 3 is an example display of a visual representation of audio data.

FIG. 3 is an example display of a visual representation 300 of audio data. The visual representation 300 includes an amplitude waveform 302 displayed at a particular zoom level. Additionally, portions of the visual representation 300 are colored to illustrate particular segments. In particular, the amplitude waveform 302 is segmented at the sentence segment type into segments 304, 306, and 308. In some implementations, each consecutive segment is a different or alternating color (e.g., different shades of yellow as shown in FIG. 3). Additionally, portions of the audio data without speech content 310 and 312 (and thus not part of a segment) are shown shaded in another color. Additionally, a background 314 is colored to indicate a different segment type, for example, a particular speaker. Thus, as shown in the visual representation 300, three separate sentences are spoken by a single speaker with two small breaks between sentences.

Figure 4:
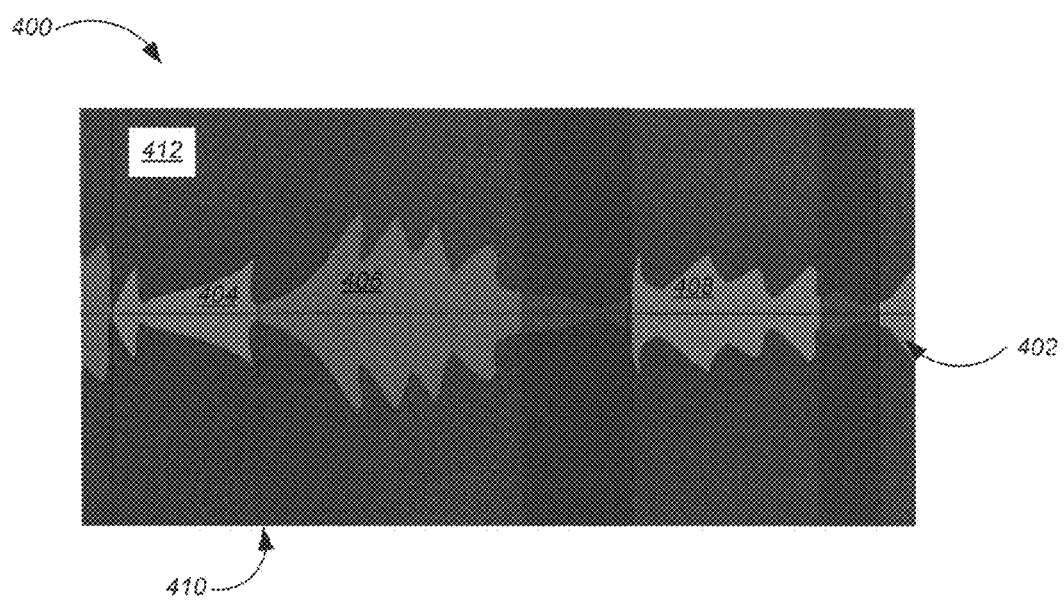
FIG. 4 is an example display of a visual representation of audio data.

FIG. 4 is an example display of a visual representation 400 of audio data. The visual representation 400 includes an amplitude waveform 402 displayed at a particular zoom level. Moreover, the visual representation 400 shows the amplitude waveform 402 at a higher zoom level than the amplitude waveform 302 of FIG. 3. Thus, the amplitude waveform 402 shows a greater level of detail as compared with the amplitude waveform 302, but also a smaller portion of the audio data (e.g., over a smaller time window). Additionally, the change in zoom level has resulted in a change in the segment type for segments displayed in the visual representation 400. In particular, the amplitude waveform 402 includes segments colored to indicate particular words including words 404, 406, 408 instead of the sentence segments shown in FIG. 3.

Each word is colored in a different shade of green to facilitate identification of the beginning and ending points between words. For example, words 404 and 406 are not separated by a break. As a result, without modifying the shading between the words 404 and 406 it can be difficult to identify the boundary where word 404 ends and where word 406 begins. Additionally, vertical lines can be included to further identify segment boundaries. For example, word 404 and word 406 are separated by vertical line 410.

In some implementations, vertical lines or other demarcation between segments are used instead of varying color between adjacent segments. Alternatively, the vertical line or other demarcations can be omitted and the adjacent segments distinguished primarily by changes in color.

The visual representation 400 also includes a background 412, which can indicate another segment type relative to the segment type presented in the amplitude waveform 402. For example, the background 412 can indicate a particular speaker as in FIG. 3 or some other segment (e.g., paragraph segment level).

Figure 5:
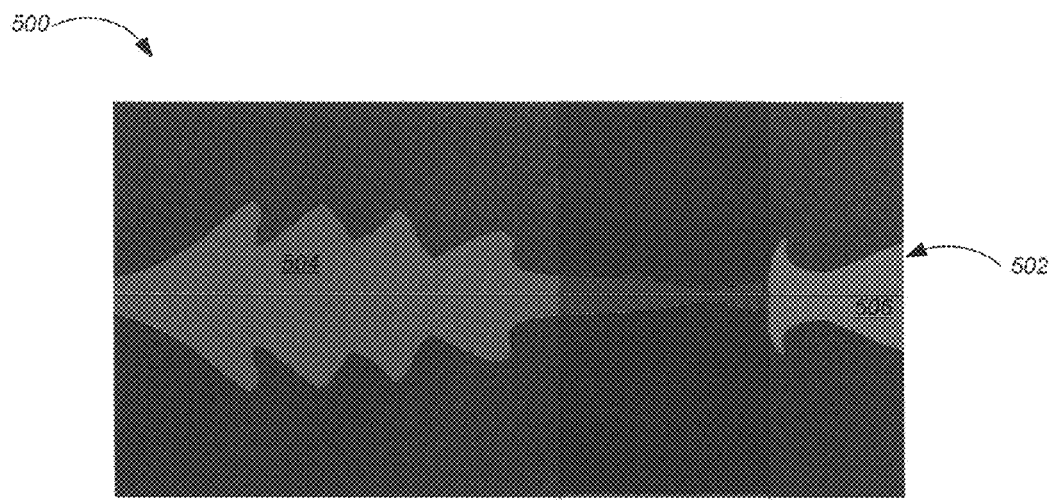
FIG. 5 is an example display of a visual representation of audio data.

FIG. 5 is an example display of a visual representation 500 of audio data. The visual representation 500 includes an amplitude waveform 502 displayed at a particular zoom level. Moreover, the visual representation 500 shows the amplitude waveform 502 at a higher zoom level than the amplitude waveform 402 of FIG. 4. However, the segment type displayed in the visual representation 400 is unchanged. The amplitude waveform 402 includes segments 502 and 504 indicating individual words. In some other implementations, an increase or decrease in zoom level results in a change in the segment type, for example, to a finer segment level e.g., phonemes.

Figure 6:
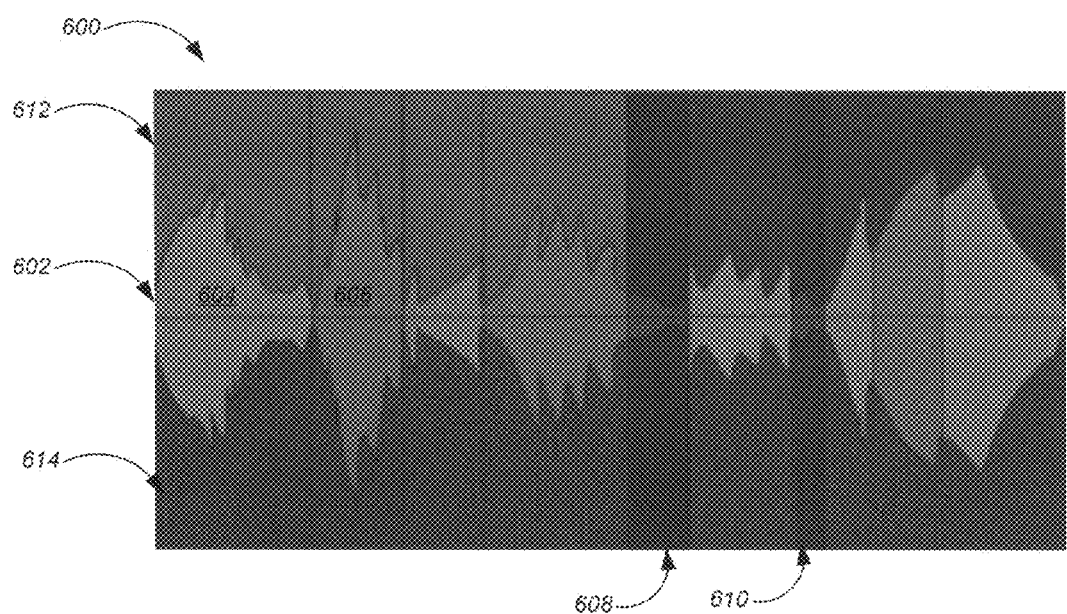
FIG. 6 is an example display of a visual representation of audio data.

FIG. 6 is an example display of a visual representation 600 of audio data. The visual representation 600 includes an amplitude waveform 602 displayed at a particular zoom level. The amplitude waveform 602 includes segments indicating a particular segment level, e.g., individual words. For example, segments 604 and 606 indicate separate words. Breaks in the speech are shown by colored portions 608 and 610.

Additionally, in the visual representation 600, two different background colorings are shown. In particular, first background colorings 612 are displayed above the amplitude waveform 602 while a second background colorings 614 are shown below the amplitude waveform 602. Consequently, different information can be displayed in different portions of the respective background portions. In particular, the example of FIG. 6 includes the first background colorings 612 indicating sentence segments and the second background colorings 614 indicating a the speaker of the corresponding audio data. Thus, a single visual representation 600 can display various types of information including identifying words, sentences, and speakers.

In some implementations, the system presents the visual representation of audio data within an interface, for example, of a digital audio workstation. The interface can include tools for viewing and editing the audio data. Additionally, the interface can include an overview representation in a separate portion of the interface or as an overlay of the visual representation of the audio data (e.g., as a transparent overlay). The overview representation can display the entire audio data (e.g., a full amplitude waveform) while the visual representation shows a particular portion depending on the zoom level selected. In some implementations, the overview representation is modified according to the segment type displayed in the visual representation. For example, if the visual representation includes an amplitude waveform colored to indicated different sentences, the overview representation can include an amplitude waveform showing sentences for the entire amplitude waveform as opposed to only the portion shown in the visual representation. Additionally, the overview representation can dynamically change depending on the user interaction with the visual representation (e.g., changing the segment type displayed).

In some implementations, the segments include a confidence level. For example, the segments can be colored according to a confidence that the particular segment has been correctly transcribed (e.g., a confidence level for each word segment). The confidence level is a likelihood that the transcription is error free. In some implementations, the system blends the audio data (e.g., automatically or in response to a received input) to remove segments having a confidence level that is less than a specified threshold (e.g., less than 40% confidence). Alternatively, a user can specify a threshold confidence level for displaying segments. In some implementations, the confidence level of particular segments is represented by a brightness within the visual representation. For example, particular segment colors can have brightness levels that vary according to the confidence level of that segment.

In some implementations, the system can search the visual representation of the audio data (e.g., the displayed amplitude waveform) for particular segments using the transcribed information. For example, a user can input text (e.g., a word or a sentence) and the system can search for that text in the audio data. When found, the system can snap an index marker to the location in the audio data corresponding to the text. Alternatively, the system can identify the text using a highlighting or coloring of the portion of the audio data including the text. In some implementations, the system automatically changes the zoom level depending on the search (e.g., if a single word is searched for the system can zoom in to show the word more clearly within the visual representation (e.g., within a waveform).

In some implementations, the audio data and segments can be represented using other types of visual representations. As discussed above, the audio data can be presented in a frequency spectrogram or other visual representation. Additionally, other structures can be used to represent segments of the audio data including rectangular arrays filled with colors depending on segment types, histograms, bar charts, or other representations.

In some implementations, the visual representation can be associated with video data. For example, a video stream typically includes chapters and scenes as particular hierarchical information (e.g., as segment types). A visual representation of thumbnails or other images representing particular frames of the video data can include indicators to identify the particular scene or chapter the frame belongs to. For example, different colors can be used to tint frames to indicate particular segment types. Similar techniques can be used for other types of data having a hierarchical structure.

Figure 7:
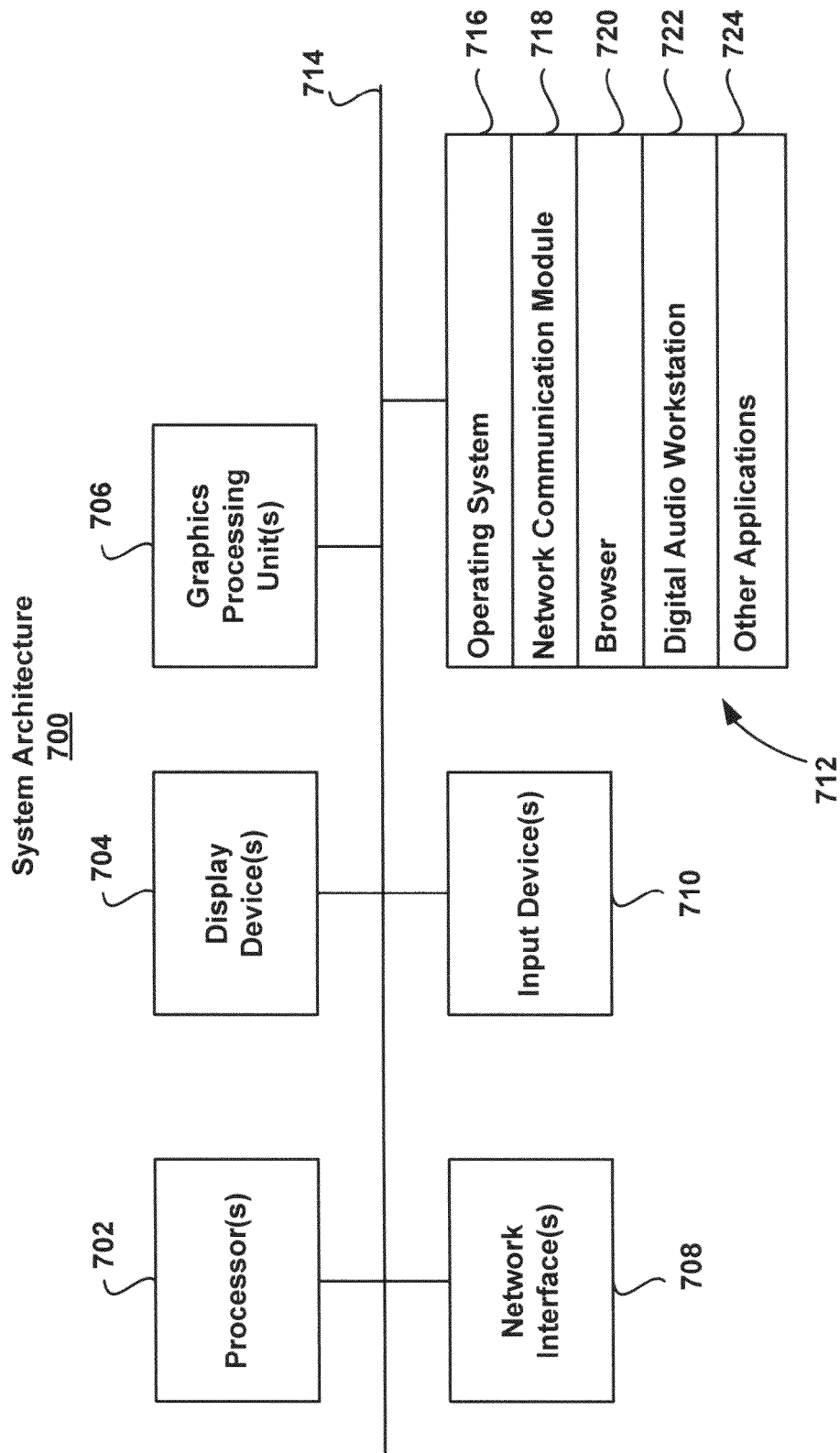
FIG. 7 is a block diagram of an example user system architecture.

FIG. 7 is a block diagram of an exemplary user system architecture 700. The system architecture 700 is capable of hosting a audio processing application that can electronically receive, display, and edit one or more audio signals. The architecture 700 includes one or more processors 702 (e.g., IBM PowerPC, Intel Pentium 4, etc.), one or more display devices 704 (e.g., CRT, LCD), graphics processing units 706

(e.g., NVIDIA GeForce, etc.), a network interface 708 (e.g., Ethernet, FireWire, USB, etc.), input devices 710 (e.g., keyboard, mouse, etc.), and one or more computer-readable mediums 712. These components exchange communications and data via one or more buses 714 (e.g., EISA, PCI, PCI Express, etc.).

The term "computer-readable medium" refers to any medium that participates in providing instructions to a processor 702 for execution. The computer-readable medium 712 further includes an operating system 716 (e.g., Mac OS®, Windows®, Linux, etc.), a network communication module 718, a browser 720 (e.g., Safari®, Microsoft® Internet Explorer, Netscape®, etc.), a digital audio workstation 722, and other applications 724.

The operating system 716 can be multi-user, multiprocessing, multitasking, multithreading, real-time and the like. The operating system 716 performs basic tasks, including but not limited to: recognizing input from input devices 710; sending output to display devices 704; keeping track of files and directories on computer-readable mediums 712 (e.g., memory or a storage device); controlling peripheral devices (e.g., disk drives, printers, etc.); and managing traffic on the one or more buses 714. The network communications module 718 includes various components for establishing and maintaining network connections (e.g., software for implementing communication protocols, such as TCP/IP, HTTP, Ethernet, etc.). The browser 720 enables the user to search a network (e.g., Internet) for information (e.g., digital media items).

The digital audio workstation 722 provides various software components for performing the various functions for displaying visual representations and editing audio data, as described with respect to FIGS. 1-6 including displaying different segment types. Additionally, the digital audio workstation can include a transcription engine for generating transcription information (e.g., as metadata) from received audio data.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
receiving digital audio data including hierarchical segment information, the hierarchical segment information identifying one or more segments of the audio data for each of a plurality of segment types, wherein the segment types include one or more of phoneme, word, sentence, paragraph, or speaker, and wherein each of the segment types corresponds to one of a plurality of levels of a segment hierarchy; and
displaying a visual representation of the audio data at a first zoom level in an interface, the visual representation displaying audio data as a function of time on a time axis and a feature on a feature axis, the visual representation of the audio data further including a display of visual identifiers for each segment of one or more segments of a first segment type, wherein the visual identifiers are concurrently displayed such that adjacent segments of the first segment type are visually distinguished within the visual representation of the audio data.

2. The method of claim 1, further comprising:
receiving an input to change the first zoom level of the visual representation of the audio data to a second zoom level; and
modifying the visual representation of the audio data according to the second zoom level including determining a second segment type for the second zoom level and displaying visual identifiers in the visual representation of one or more segments at the second segment type.

3. The method of claim 1. further comprising:
receiving an input to change the first segment type displayed in the visual representation of the audio data to a second segment type that is distinct from the first segment type; and
modifying the visual representation of audio data to display one or more segments at the second segment type.

4. The method of claim 3, where receiving the input to change the first segment type includes receiving a user input to a slider presented in the interface.

5. The method of claim 1, where the visual representation is an amplitude waveform and the identifiers of the one or more segments in the visual representation include displaying the one or more segments as colored or shaded portions of the amplitude waveform.

6. The method of claim 5, further comprising:
identifying one or more third segments at a segment type distinct from the first segment type according to a background identifier relative to the amplitude waveform in the visual representation of the audio data.

7. The method of claim 6, where the background identifier is a different color for each identified third segment.

8. The method of claim further comprising:
identifying distinct speakers associated with the segments displayed in the visual representation according to a corresponding background identifier.

9. The method of claim 8, where each speaker is identified with a different background color.

10. The method of claim 1, further comprising:
receiving a selection of a particular segment of the first segment type; and
performing an editing operation on the portion of the audio data corresponding to the selected segment.

11. The method of claim 10, further comprising:
receiving an input to change the first segment type associated with the selected portion of the audio data to a next larger segment type or to a next smaller segment type according to a hierarchy of segment types.

12. The method of claim 10, where the editing includes expanding or contracting a selected segment in time with respect to a reference audio segment.

13. The method of claim 10, where the editing includes modifying the audio data of the selected segment.

14. The method of claim 1, further comprising:
displaying in the visual representation of audio data an indicator of confidence level for each of the one or more identified segments where the confidence level indicates a confidence in the transcription of the segment to the audio data.

15. The method of claim 1, where the hierarchical segment information is speech transcription information.

16. The method of claim 1, where the hierarchical segment information is musical structural information.

17. The method of claim 1, where the identifiers for each segment identify boundaries between segments including inverting a position of adjacent identifiers within the visual representation of the audio data.

18. The method of claim 1, further comprising:
receiving a selection of a particular segment of the first segment type; and
responsive to a received input, modifying the visual representation of audio data to display a second segment type associated with the selected segment.

19. A method comprising:
receiving digital audio data including metadata providing hierarchical segment information in an extensible markup language description, the hierarchical segment information identifying one or more segments of the audio data for each of a plurality of segment types wherein the metadata includes speech transcription information identifying speech segments of the audio data, wherein the segment types include one or more of phoneme, word, sentence, paragraph, or speaker, and wherein each of the segment types corresponds to one of a plurality of levels of a segment hierarchy; and
displaying a visual representation of the audio data at a first zoom level in an interface, the visual representation displaying audio data as a function of time and segment type, the visual representation of the audio data further including a display of visual identifiers of one or more segments of one or more segment types, wherein the identifiers are concurrently displayed such that adjacent segments of the first segment type are visually distinguished within the visual representation of the audio data.

20. A tangible computer-readable storage medium comprising instructions operable to cause data processing apparatus to perform operations comprising:
receiving digital audio data including hierarchical segment information, the hierarchical segment information identifying one or more segments of the audio data for each of a plurality of segment types, wherein the segment types include one or more of phoneme, word, sentence, paragraph, or speaker, and wherein each of the segment types corresponds to one of a plurality of levels of a segment hierarchy; and
displaying a visual representation of the audio data at a first zoom level in an interface, the visual representation displaying audio data as a function of time on a time axis and a feature on a feature axis, the visual representation of the audio data further including a display of visual identifiers for each segment of one or more segments of a first segment type, wherein the visual identifiers are concurrently displayed such that adjacent segments of the first segment type are visually distinguished within the visual representation of the audio data.

21. The tangible computer-readable storage medium of claim 20, the operations further comprising:
receiving an input to change the first zoom level of the visual representation of the audio data to a second zoom level; and
modifying the visual representation of the audio data according to the second zoom level including determining a second segment type for the second zoom level and displaying visual identifiers in the visual representation of one or more segments at the second segment type.

22. The tangible computer-readable storage medium of claim 20, the operations further comprising:
receiving an input to change the first segment type displayed in the visual representation of the audio data to a second segment type that is distinct from the first segment type; and
modifying the visual representation of audio data to display one or more segments at the second segment type.

23. The tangible computer-readable storage medium of claim 22, where receiving the input to change the first segment type includes receiving a user input to a slider presented in the interface.

24. The tangible computer-readable storage medium of claim 20, where the visual representation is an amplitude waveform and the identifiers of the one or more segments in the visual representation include displaying the one or more segments as colored or shaded portions of the amplitude waveform.

25. The tangible computer-readable storage medium of claim 24, the operations further comprising:
identifying one or more third segments at a segment type distinct from the first segment type according to a background identifier relative to the amplitude waveform in the visual representation of the audio data.

26. The tangible computer-readable storage medium of claim 25, where the background identifier is a different color for each identified third segment.

27. The tangible computer-readable storage medium of claim 24, the operations further comprising:
identifying distinct speakers associated with the segments displayed in the visual representation according to a corresponding background identifier.

28. The tangible computer-readable storage medium of claim 27, where each speaker is identified with a different background color.

29. The tangible computer-readable storage medium of claim 20, further operable to perform the operations further comprising:
receiving a selection of a particular segment of the first segment type; and
performing an editing operation on the portion of the audio data corresponding to the selected segment.

30. The tangible computer-readable storage medium of claim 29, the operations further comprising:
receiving an input to change the first segment type associated with the selected portion of the audio data to a next larger segment type or to a next smaller segment type according to a hierarchy of segment types.

31. The tangible computer-readable Storage medium of claim 29, where the editing includes expanding or contracting a selected segment in time with respect to a reference audio segment.

32. The tangible computer-readable storage medium of claim 29, where the editing includes modifying the audio data of the selected segment.

33. The tangible computer-readable storage medium of claim 20, the operations further comprising:
displaying in the visual representation of audio data an indicator of confidence level for each of the one or more identified segments where the confidence level indicates a confidence in the transcription of the segment to the audio data.

34. The tangible computer-readable storage medium of claim 20, where the hierarchical segment information is speech transcription information.

35. The tangible computer-readable storage medium of claim 20, where the hierarchical segment information is musical structural information.

36. The tangible computer-readable storage medium of claim 20, where the identifiers for each segment identify boundaries between segments including inverting a position of adjacent identifiers within the visual representation of the audio data.

37. The tangible computer-readable storage medium of claim 20, the operations further comprising:

receiving a selection of a particular segment of the first segment type; and responsive to a received input, modifying the visual representation of audio data to display a second segment type associated with the selected segment.

38. A tangible computer-readable storage medium comprising instructions operable to cause data processing apparatus to perform operations comprising:

receiving digital audio data including metadata providing hierarchical segment information in an extensible markup language description, the hierarchical segment information identifying one or more segments of the audio data for each of a plurality of segment types wherein the metadata includes speech transcription information identifying speech segments of the audio data, wherein the segment types include one or more of phoneme, word, sentence, paragraph, or speaker, and wherein each of the segment types corresponds to one of a plurality of levels of a segment hierarchy; and displaying a visual representation of the audio data at a first zoom level in an interface, the visual representation displaying audio data as a function of time and segment type, the visual representation of the audio data further including a display of visual identifiers of one or more segments of one or more segment types, wherein the identifiers are concurrently displayed such that adjacent segments of the first segment type are visually distinguished within the visual representation of the audio data.

39. A system comprising:

a user interface device; and one or more computers operable to interact with the user interface device and to perform operations including:

receiving digital audio data including hierarchical segment information, the hierarchical segment information identifying one or more segments of the audio data for each of a plurality of segment types, wherein the segment types include one or more of phoneme, word, sentence, paragraph, or speaker, and wherein each of the segment types corresponds to one of a plurality of levels of a segment hierarchy; and displaying a visual representation of the audio data at a first zoom level in an interface, the visual representation displaying audio data as a function of time on a time axis and a feature on a feature axis, the visual representation of the audio data further including a display of visual identifiers for each segment of one or more segments of a first segment type, wherein the visual identifiers are concurrently displayed such that adjacent segments of the first segment type are visually distinguished within the visual representation of the audio data.

40. The system of claim 39, further operable to perform operations comprising:

receiving an input to change the first zoom level of the visual representation of the audio data to a second zoom level; and modifying the visual representation of the audio data according to the second zoom level including determining a second segment type for the second zoom level and displaying visual identifiers in the visual representation of one or more segments at the second segment type.

41. The system of claim 39, further operable to perform operations comprising:

receiving an input to change the first segment type displayed in the visual representation of the audio data to a second segment type that is distinct from the first segment type; and modifying the visual representation of audio data to display one or more segments at the second segment type.

42. The system of claim 41, where receiving the input to change the first segment type includes receiving a user input to a slider presented in the interface.

43. The system of claim 39, where the visual representation is an amplitude waveform and the identifiers of the one or more segments in the visual representation include displaying the one or more segments as colored or shaded portions of the amplitude waveform.

44. The system of claim 43, further operable to perform operations comprising:

identifying one or more third segments at a segment type distinct from the first segment type according to a background identifier relative to the amplitude waveform in the visual representation of the audio data.

45. The system of claim 44, where the background identifier is a different color for each identified third segment.

46. The system of claim 44, further operable to perform operations comprising:

identifying distinct speakers associated with the segments displayed in the visual representation according to a corresponding background identifier.

47. The system of claim 46, where each speaker is identified with a different background color.

48. The system of claim 39, further operable to perform operations comprising:

receiving a selection of a particular segment of the first segment type; and performing an editing operation on the portion of the audio data corresponding to the selected segment.

49. The system of claim 18, further operable to perform operations comprising:

receiving an input to change the first segment type associated with the selected portion of the audio data to a next larger segment type or to a next smaller segment type according to a hierarchy of segment types.

50. The system of claim 48, where the editing includes expanding or contracting a selected segment in time with respect to a reference audio segment.

51. The system of claim 48, where the editing includes modifying the audio data of the selected segment.

52. The system of claim 39, further operable to perform operations comprising:

displaying in the visual representation of audio data an indicator of confidence level for each of the one or more identified segments where the confidence level indicates a confidence in the transcription of the segment to the audio data.

53. The system of claim 39, where the hierarchical segment information is speech transcription information.

54. The system of claim 39, where the hierarchical segment information is musical structural information.

55. The system of claim 39, where the identifiers for each segment identify boundaries between segments including inverting a position of adjacent identifiers within the visual representation of the audio data.

56. The system of claim 39, further operable to perform operations comprising:

receiving a selection of a particular segment of the first segment type; and responsive to a received input, modifying the visual representation of audio data to display a second segment type associated with the selected segment.

57. A system comprising:

a user interface device; and one or more computers operable to interact with the user interface device and to perform operations including:

receiving digital audio data including metadata providing hierarchical segment information in an extensible markup language description, the hierarchical segment information identifying one or more segments of the audio data for each of a plurality of segment types wherein the metadata includes speech transcription information identifying speech segments of the audio data, wherein the segment types include one or more of phoneme, word, sentence, paragraph, or speaker, and wherein each of the segment types corresponds to one of a plurality of levels of a segment hierarchy; and displaying a visual representation of the audio data at a first zoom level in an interface, the visual representation displaying audio data as a function of time and segment type, the visual representation of the audio data further including a display of visual identifiers of one or more segments of one or more segment types, wherein the identifiers are concurrently displayed such that adjacent segments of the first segment type are visually distinguished within the visual representation of the audio data.

58. The method of claim 1 wherein the visual representation of audio data includes a first segment and a second segment of the first segment type, wherein the first segment is adjacent to the second segment, and wherein the visual identifier for the first segment is different from the visual identifier for the second segment.

\* \* \* \* \*